United States Patent
Branson et al.

(10) Patent No.: US 8,495,189 B2
(45) Date of Patent: Jul. 23, 2013

(54) MANAGING THE PERFORMANCE OF AN APPLICATION CARRIED OUT USING A PLURALITY OF PLUGGABLE PROCESSING COMPONENTS

(75) Inventors: Michael J. Branson, Rochester, MN (US); Zachary A. Garbow, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1453 days.

(21) Appl. No.: 12/129,400

(22) Filed: May 29, 2008

(65) Prior Publication Data
US 2009/0300625 A1 Dec. 3, 2009

(51) Int. Cl.
*G06F 15/173* (2006.01)
(52) U.S. Cl.
USPC .......................................... 709/223; 709/221
(58) Field of Classification Search
USPC .................. 709/201, 220, 221, 223; 718/102, 718/104; 714/3, 48, 38.1
See application file for complete search history.

(56) References Cited

U.S. PATENT DOCUMENTS

| 8,010,337 B2* | 8/2011 | Narayanan et al. ............. 703/22 |
| 2002/0116477 A1* | 8/2002 | Somashekar et al. ......... 709/220 |
| 2004/0064558 A1* | 4/2004 | Miyake .......................... 709/226 |
| 2004/0221038 A1* | 11/2004 | Clarke et al. .................. 709/226 |
| 2008/0228862 A1* | 9/2008 | Mackey ......................... 709/203 |
| 2009/0172689 A1* | 7/2009 | Bobak et al. .................. 718/104 |
| 2010/0239186 A1* | 9/2010 | Fowler et al. ................. 382/291 |

* cited by examiner

*Primary Examiner* — Frantz Jean
(74) *Attorney, Agent, or Firm* — Biggers & Ohanian LLP (57) ABSTRACT

Methods, apparatus, and products are disclosed for managing the performance of an application carried out using a plurality of pluggable processing components, the pluggable processing components executed on a plurality of compute nodes, that include: identifying a current configuration of the pluggable processing components for carrying out the application; receiving a plurality of performance indicators produced during execution of the pluggable processing components; and altering the current configuration of the pluggable processing components in dependence upon the performance indicators and one or more additional pluggable processing components.

18 Claims, 8 Drawing Sheets

MANAGING THE PERFORMANCE OF AN APPLICATION CARRIED OUT USING A PLURALITY OF PLUGGABLE PROCESSING COMPONENTS

BACKGROUND OF THE INVENTION

1. Field of the Invention

The field of the invention is data processing, or, more specifically, methods, apparatus, and products for managing the performance of an application carried out using a plurality of pluggable processing components.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances.

Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute applications that include both parallel algorithms and serial algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the algorithms of an application are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource—the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. A torus network lends itself to point to point operations. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers. A tree network provides high bandwidth and low latency for certain collective operations, message passing operations where all compute nodes participate simultaneously, such as, for example, an allgather.

Many applications that execute in these parallel computing systems are each composed of a plurality of individual, reusable software components. For example, a facial recognition software application may be composed of one reusable software component that performs image preprocessing, another reusable software component that performs face position detection within the processed image, still another reusable software component that measures facial features, and so on.

SUMMARY OF THE INVENTION

Methods, apparatus, and products are disclosed for managing the performance of an application carried out using a plurality of pluggable processing components, the pluggable processing components executed on a plurality of compute nodes, that include: identifying a current configuration of the pluggable processing components for carrying out the application; receiving a plurality of performance indicators produced during execution of the pluggable processing components; and altering the current configuration of the pluggable processing components in dependence upon the performance indicators and one or more additional pluggable processing components.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
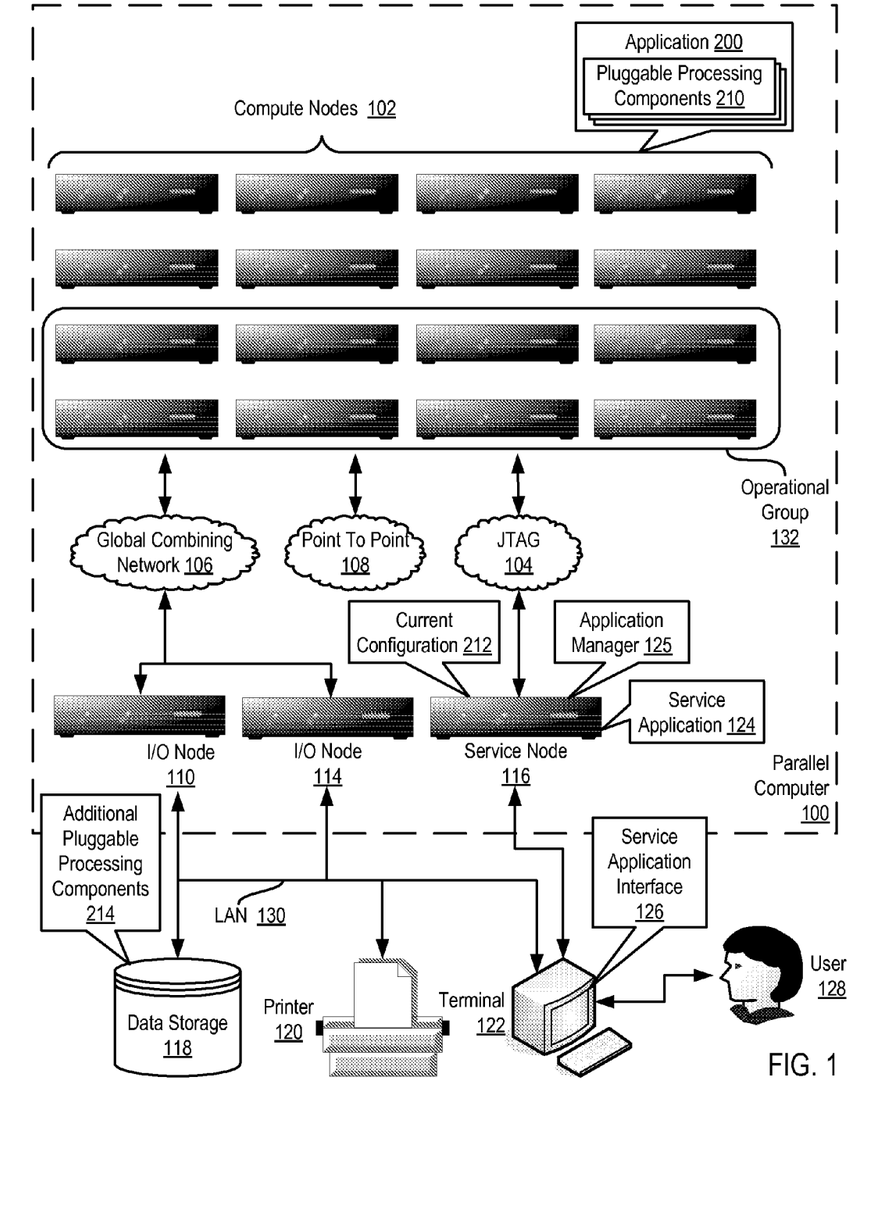
FIG. 1 illustrates an exemplary system for managing the performance of an application carried out using a plurality of pluggable processing components according to embodiments of the present invention.

Exemplary methods, apparatus, and computer program products for managing the performance of an application carried out using a plurality of pluggable processing components according to embodiments of the present invention are described with reference to the accompanying drawings, beginning with FIG. 1. FIG. 1 illustrates an exemplary system for managing the performance of an application carried out using a plurality of pluggable processing components according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

In the example of FIG. 1, the compute nodes (102) operate to execute an application (200) that is carried out using a plurality of pluggable processing components (210). A pluggable processing component is a software module, specifically a set of computer program instructions, that when executed performs a particular task that is a logical, discrete, reusable building block for more complex software systems. That is, a software developer may create a pluggable processing component to perform a specific task within broader software systems that the software developer can reuse from one system to another. The processing components are referred to as 'pluggable' because these components may be plugged together in different ways to form a variety of software applications. For an example, consider a facial recognition software application that is composed of one pluggable processing component that performs image preprocessing, another pluggable processing component that performs face position detection within the processed image, still another pluggable processing component that measures facial features, and so on.

The execution configuration for the pluggable processing components (210) may change during or between periods in which the pluggable processing components (210) are executed on the compute nodes (102). In the example of FIG. 1, each pluggable processing component (210) may be executed on a different compute node (102). In some configurations, however, compute nodes (102) may support multiple pluggable processing components (210). During execution, a service node may move one pluggable processing component (210) from one compute node (102) to another, or multiple pluggable processing components (210) may be collapsed for execution on one compute node (102) from multiple compute nodes (102). The service node may move a pluggable processing component (210) from one node to another by transferring the executable version of the pluggable processing component (210) along with processing state information such as memory contents, cache contents, processor registers, data, and so on from one compute node to another.

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bidirectional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

In the example of FIG. 1, the service node (116) has installed upon it an application manager (125). The application manager (125) of FIG. 1 includes a set of computer program instructions capable of managing the performance of an application carried out using a plurality of pluggable processing components according to embodiments of the present invention. The application manager (125) operates generally for managing the performance of an application carried out using a plurality of pluggable processing components according to embodiments of the present invention by: identifying a current configuration (212) of the pluggable processing components (210) for carrying out the application (200); receiving a plurality of performance indicators produced during execution of the pluggable processing components (210); and altering the current configuration (212) of the pluggable processing components (210) in dependence upon the performance indicators and one or more additional pluggable processing components (214).

The current configuration (212) of FIG. 1 is a data structure that specifies the pluggable processing components (210) and the manner in which the pluggable processing components (210) work together when executed to carry out the application (200). The current configuration (212) may specify the compute node (102) on which each pluggable processing component (210) executes. The current configuration (212) may specify the manner in which data flows among the pluggable processing components (210). In the example of FIG. 1, the current configuration (212) may be implemented as a structured document, a text file, a C++ object, Java object, or any other implementation as will occur to those of skill in the art. As mentioned above, the current configuration (212) may be altered based on various performance indicators received during execution.

In the example of FIG. 1, the performance indicators describe attributes related to the execution of the pluggable processing components (210). The performance indicators may include indicators that describe the inputs and outputs of one or more of the pluggable processing components. The performance indicators may include indicators that describe the resources consumed during execution of each of the pluggable processing components (210) such as, for example, memory resources, processing resources, I/O resources, network resources, data storage resources, and so on. The performance indicators may include indicators that describe pluggable processing component performance profiles for the pluggable processing components (210). A pluggable processing component performance profile specifies the execution performance for a pluggable processing component. The pluggable processing component performance profile may specify the execution performance based on, for example, the occurrence of page faults, invocation of error handlers, memory utilization, processor utilization, or any other measure of execution performance as will occur to those of skill in the art. The performance indicators may also include indicators for historical performance or indicators for predictive performance. The performance indicators may also include indicators that describe environmental conditions relating to the compute nodes (102), the pluggable processing components (210), or the data processed or generated by the pluggable processing components (210). The performance indicators may also include indicators that specify system administrator advice such as, for example, information that a particular compute node is going to be taken offline or repair or replacement. Readers will note that exemplary performance indicators described above are for explanation only and not for limitation. Other performance indicators as will occur to those of skill in the art may also be useful in managing the performance of the application (200) carried out using the plurality of pluggable processing components (210) according to embodiments of the present invention.

In the example of FIG. 1, the plurality of compute nodes (102) are implemented in a parallel computer (100) and are connected together using a plurality of data communications networks (104, 106, 108). The point to point network (108) is optimized for point to point operations. The global combining network (106) is optimized for collective operations. Although managing the performance of an application carried out using a plurality of pluggable processing components according to embodiments of the present invention is described above in terms of an architecture for a parallel computer, readers will note that such an embodiment is for explanation only and not for limitation. In fact, managing the performance of an application carried out using a plurality of pluggable processing components according to embodiments of the present invention may be implemented using a variety of computer system architectures composed of a plurality of nodes network-connected together, including for example architectures for a cluster of nodes, a distributed computing system, a grid computing system, and so on.

The arrangement of nodes, networks, and I/O devices making up the exemplary system illustrated in FIG. 1 are for explanation only, not for limitation of the present invention. Data processing systems capable of managing the performance of an application carried out using a plurality of pluggable processing components according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of managing the performance of an application carried out using a plurality of pluggable processing components according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Managing the performance of an application carried out using a plurality of pluggable processing components according to embodiments of the present invention may be generally implemented on a parallel computer that includes a plurality of compute nodes, among other types of exemplary systems. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node (152) useful in a parallel computer capable of managing the performance of an application carried out using a plurality of pluggable processing components (210) according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152).

Figure 2:
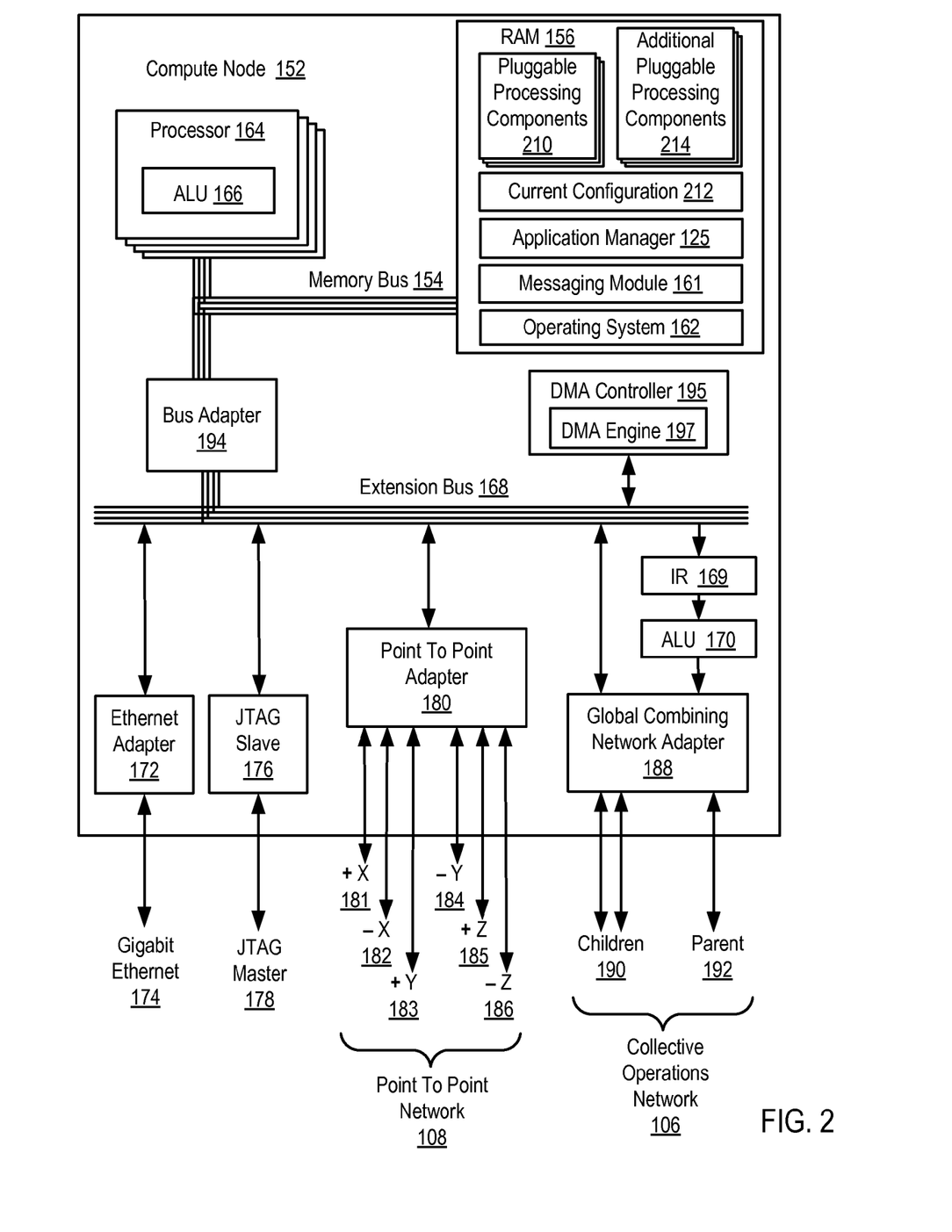
FIG. 2 sets forth a block diagram of an exemplary compute node useful in a parallel computer capable of managing the performance of an application carried out using a plurality of pluggable processing components according to embodiments of the present invention.

Stored in RAM (156) of FIG. 2 are one or more pluggable processing components (210) along with additional pluggable processing components (214). The pluggable processing components (210) of FIG. 2 are used to carry out an application, while the additional pluggable processing components (214) are used to augment or replace the components (210) in the application or are used to carry out entirely different applications. As mentioned above, a pluggable processing component is a set of computer program instructions that when executed performs a particular task that is a logical, discrete, reusable building block for more complex software systems.

Also stored in RAM (156) is an application manager (125). The application manager (125) of FIG. 2 includes a set of computer program instructions capable of managing the performance of an application carried out using a plurality of pluggable processing components according to embodiments of the present invention. The application manager (125) operates generally for managing the performance of an application carried out using a plurality of pluggable processing components according to embodiments of the present invention by: identifying a current configuration (212) of the pluggable processing components (210) for carrying out the application; receiving a plurality of performance indicators produced during execution of the pluggable processing components (210); and altering the current configuration (212) of the pluggable processing components (210) in dependence upon the performance indicators and one or more additional pluggable processing components (214).

Also stored RAM (156) is a messaging module (161), a library of computer program instructions that carry out parallel communications among compute nodes, including point to point operations as well as collective operations. User-level applications effect data communications with other applications running on other compute nodes by calling software routines in the messaging modules (161). A library of parallel communications routines may be developed from scratch for use in systems according to embodiments of the present invention, using a traditional programming language such as the C programming language, and using traditional programming methods to write parallel communications routines. Alternatively, existing prior art libraries may be used such as, for example, the 'Message Passing Interface' ('MPI') library, the 'Parallel Virtual Machine' ('PVM') library, and the Aggregate Remote Memory Copy Interface ('ARMCI') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft Vista™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for managing the performance of an application carried out using a plurality of pluggable processing components according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in managing the performance of an application carried out using a plurality of pluggable processing components according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one compute node to another. While the CPU may initiates the DMA transfer, the CPU does not execute it. In the example of FIG. 2, the DMA engine (195) and the DMA controller (195) support the messaging module (161).

Figure 3A:
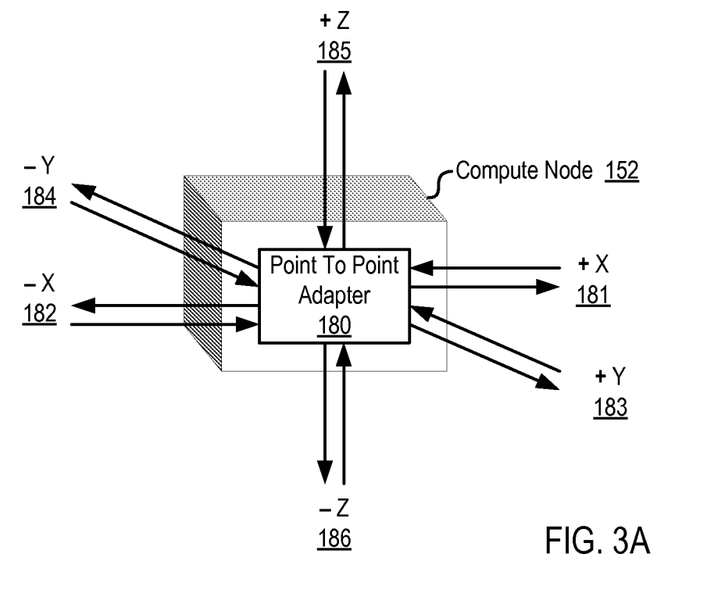
FIG. 3A illustrates an exemplary Point To Point Adapter useful in systems capable of managing the performance of an application carried out using a plurality of pluggable processing components according to embodiments of the present invention.

For further explanation, FIG. 3A illustrates an exemplary Point To Point Adapter (180) useful in systems capable of managing the performance of an application carried out using a plurality of pluggable processing components according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
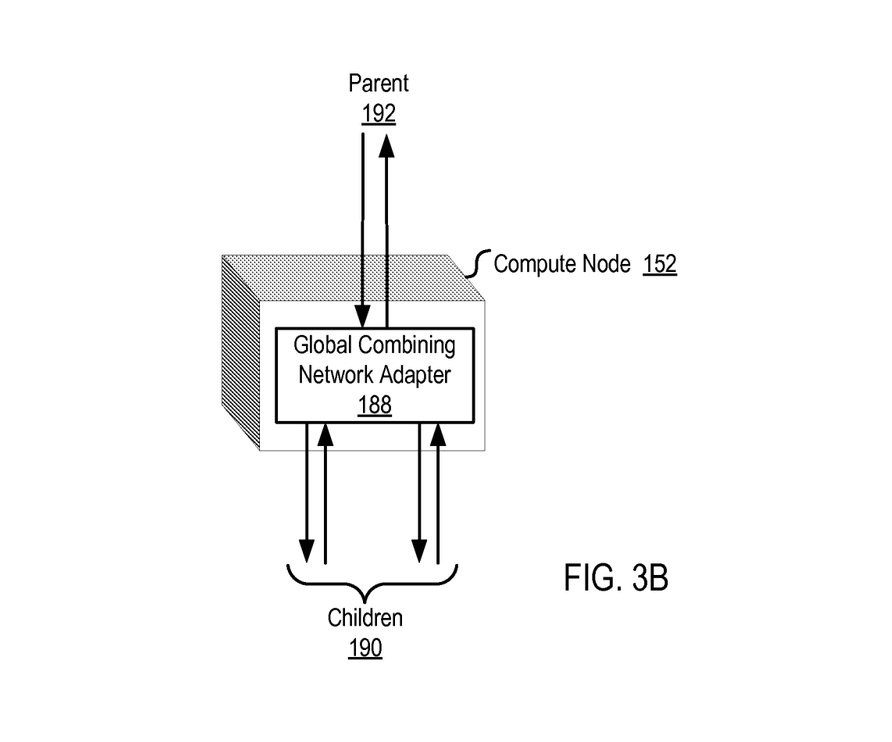
FIG. 3B illustrates an exemplary Global Combining Network Adapter useful in systems capable of managing the performance of an application carried out using a plurality of pluggable processing components according to embodiments of the present invention.

For further explanation, FIG. 3B illustrates an exemplary Global Combining Network Adapter (188) useful in systems capable of managing the performance of an application carried out using a plurality of pluggable processing components according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
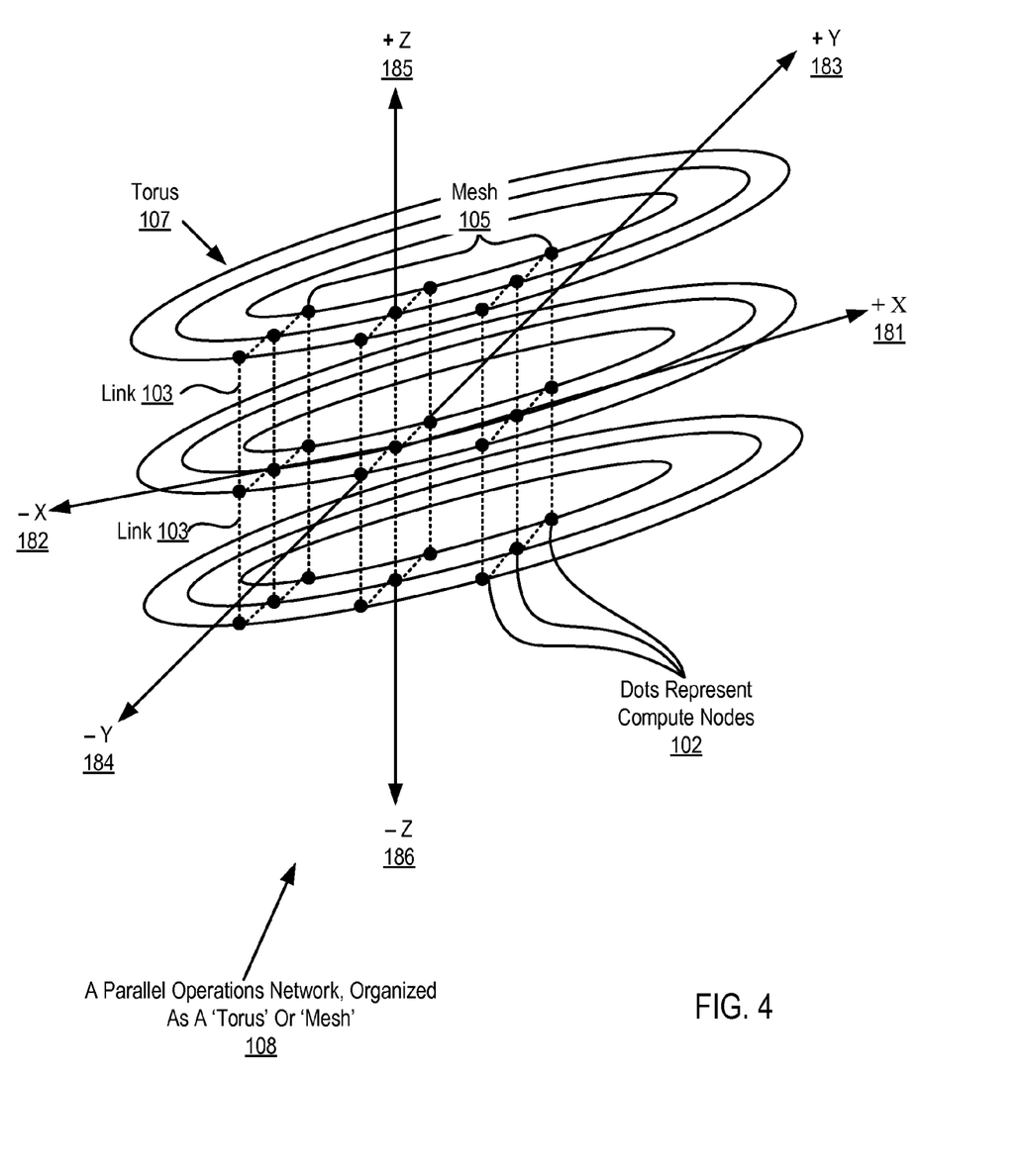
FIG. 4 sets forth a line drawing illustrating an exemplary data communications network optimized for point to point operations useful in systems capable of managing the performance of an application carried out using a plurality of pluggable processing components in accordance with embodiments of the present invention.

For further explanation, FIG. 4 sets forth a line drawing illustrating an exemplary data communications network (108) optimized for point to point operations useful in systems capable of managing the performance of an application carried out using a plurality of pluggable processing components in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in managing the performance of an application carried out using a plurality of pluggable processing components in accordance with embodiments of the present invention may contain only a few compute nodes or may contain thousands of compute nodes.

Figure 5:
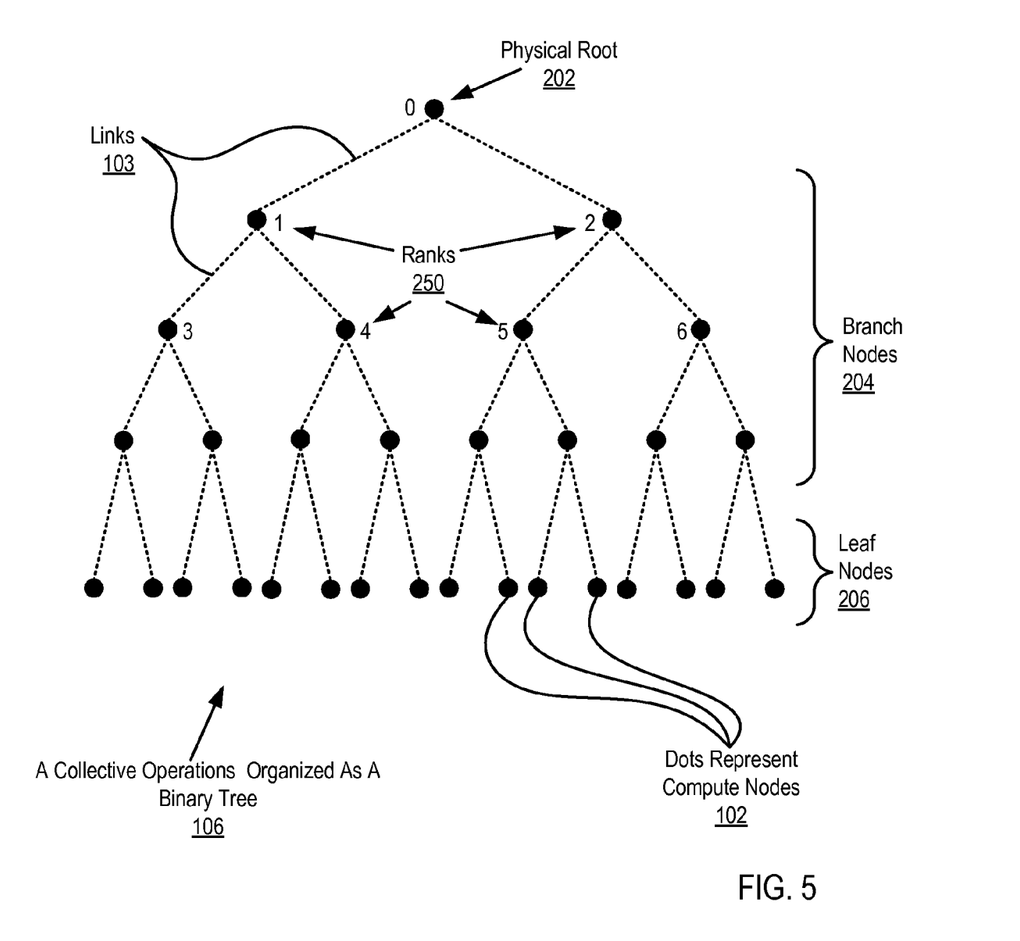
FIG. 5 sets forth a line drawing illustrating an exemplary data communications network optimized for collective operations useful in systems capable of managing the performance of an application carried out using a plurality of pluggable processing components in accordance with embodiments of the present invention.

For further explanation, FIG. 5 sets forth a line drawing illustrating an exemplary data communications network (106) optimized for collective operations useful in systems capable of managing the performance of an application carried out using a plurality of pluggable processing components in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for managing the performance of an application carried out using a plurality of pluggable processing components in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
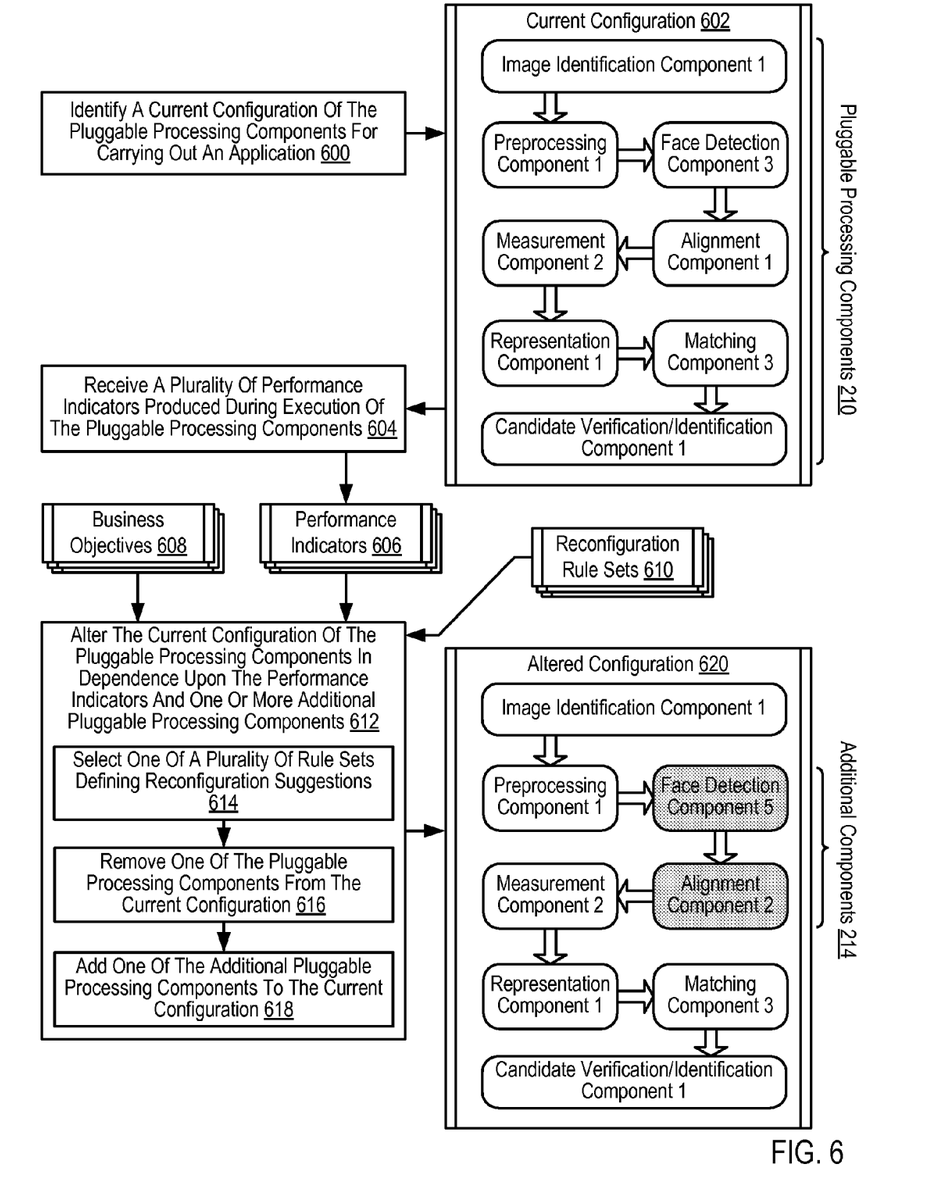
FIG. 6 sets forth a flow chart illustrating an exemplary method for managing the performance of an application carried out using a plurality of pluggable processing components according to embodiments of the present invention.

For further explanation, FIG. 6 sets forth a flow chart illustrating an exemplary method for managing the performance of an application carried out using a plurality of pluggable processing components (210) according to embodiments of the present invention. Managing the performance of an application carried out using a plurality of pluggable processing components (210) according to embodiments of the present invention may be carried out by an application manager installed on a service node such as, for example, a service node as described above. The pluggable processing components (210) of FIG. 6 are executed on a plurality of compute nodes such as, for example, the compute nodes discussed above.

The method of FIG. 6 includes identifying (600) a current configuration (602) of the pluggable processing components (210) for carrying out the application. Identifying (600) a current configuration (602) of the pluggable processing components (210) for carrying out the application according to the method of FIG. 6 may be carried out by retrieving the current configuration (602) from a repository that is associated with a particular application that a system administrator desires to execute. As described above, a current configuration (212) of FIG. 6 is a data structure that specifies the pluggable processing components (210) and the manner in which the pluggable processing components (210) work together when executed to carry out the application. The current configuration (212) may specify the compute node (102) on which each pluggable processing component (210) executes. The current configuration (212) may specify the manner in which data flows among the pluggable processing components (210). In the example of FIG. 6, the current configuration (212) may be implemented as a structured document, a text file, a C++ object, Java object, or any other implementation as will occur to those of skill in the art.

In the example of FIG. 6, the current configuration (602) specifies an arrangement of pluggable processing components (210) used to carry out an application of a facial recognition system. The current configuration (602) specifies that the facial recognition system is carried out using the exemplary pluggable processing components illustrated in FIG. 6 that operate as follows: An image identification component provides an image to a preprocessing component, which cleans up the image by removing visual noise attributable to the camera capturing the image or other visual noise or aberrations. The preprocessing component provides the preprocessed image to a face detection component that identifies a person's face within the image. The face detection component in turn provides the image and the location of the face in the image to an alignment component that determines the head's position, size, and pose. The alignment component then provides the image and the alignment data to a measurement component that measures the curves of the face on a sub-millimeter or microwave scale and creates a template that describes the features of the face in the image. A representation component receives the template from the measure component and translates the template into a set of codes that represent the features of the face in the image. The representation component then provides the set of codes to a matching component that compares the set of codes with codes representing faces of known persons in a database to identify a match. When performing identity verification, a candidate verification/identification component receives an identifier for a matching face in the database and compares information associated with the matched face in the database with information provided by the person whose face is captured for facial recognition. When performing identification, the candidate verification/identification component receives an identifier for a matching face in the database and provides system administrators with the information associated with the matched face in the database.

Each of the exemplary pluggable processing components (210) in FIG. 6 is only one of many potential pluggable processing components that could be combined to carry out a facial recognition system. For example, multiple face detection components may be utilized, each one using a different algorithm for detecting a face in an image, and each one performing better than the other under certain conditions. For example, one face detection component may perform better when the image is captured on a bright and sunny day, while another face detection component performs better when the image is captured in the rain or using low light levels. Because any number of components may be used to carry out the application, the current configuration (602) specifies each of the pluggable processing components (210) using an identifier. For example, the image identification component specified by the current configuration (602) to carry out a facial recognition system is image identification component 1. Similarly, the current configuration (602) of FIG. 6 specifies preprocessing component 1, face detection component 3, alignment component 1, measurement component 2, representation component 1, matching component 3, and candidate verification/identification component 1.

The method of FIG. 6 includes receiving (604) a plurality of performance indicators (606) produced during execution of the pluggable processing components (210). In the example of FIG. 6, the performance indicators (606) describe attributes related to the execution of the pluggable processing components (210). Such performance indicators (606) may be used to determine how or whether to alter the current configuration (212) of the application. The performance indicators (606) of FIG. 6 may include indicators that describe the inputs and outputs of one or more of the pluggable processing components. For example, a performance indictor may specify that the measurement component 2 used to carry out the exemplary face recognition application is producing measurements in the range of 0.25 inches to 5.00 inches, which may be used to confirm that the component is accurately measuring facial features as opposed to measurements in the range 2.00 to 6.00 feet that indicate the component is malfunctioning or being given erroneous data by other pluggable processing components.

The performance indicators (606) of FIG. 6 may also include indicators that describe the resources consumed during execution of each of the pluggable processing components (210) such as, for example, memory resources, processing resources, I/O resources, network resources, data storage resources, and so on. The performance indicators (606) may include indicators that describe pluggable processing component performance profiles for the pluggable processing components (210). A pluggable processing component performance profile specifies the execution performance for a pluggable processing component. The pluggable processing component performance profile may specify the execution performance based on, for example, the occurrence of page faults, invocation of error handlers, memory utilization, processor utilization, or any other measure of execution performance as will occur to those of skill in the art. The performance indicators (606) may also include indicators for historical performance or indicators for predictive performance.

In the example of FIG. 6, the performance indicators (606) may further include indicators that describe environmental conditions relating to the compute nodes (102), the pluggable processing components (210), or the data processed or generated by the pluggable processing components (210). The performance indicators (606) may also include indicators that specify system administrator advice such as, for example, information that a particular compute node is going to be taken offline or repair or replacement. Readers will note that exemplary performance indicators (606) described above are for explanation only and not for limitation. Other performance indicators (606) as will occur to those of skill in the art may also be useful in managing the performance of the application (200) carried out using the plurality of pluggable processing components (210) according to embodiments of the present invention.

Receiving (604) a plurality of performance indicators produced during execution of the pluggable processing components (210) according to the method of FIG. 6 may vary depending on the type of performance indicators received. When the performance indicators are implemented as the inputs and outputs of the pluggable processing components (210) or pluggable processing component performance profiles, receiving (604) a plurality of performance indicators produced during execution of the pluggable processing components (210) according to the method of FIG. 6 may be carried out by instrumenting the pluggable processing components (210) and receiving instrumentation measurements such as, for example, values for the input and output of each pluggable component (210), the number of times particular portions of each component (210) are executed, the number and type of error handlers encountered during execution, and so on.

When the performance indicators are implemented as resource consumption indicators, receiving (604) a plurality of performance indicators produced during execution of the pluggable processing components (210) according to the method of FIG. 6 may be carried out by receiving performance statistics from the compute nodes executing the pluggable processing components (210) such as, for example, number of cache misses, number of page faults, processor utilization, memory utilization, I/O utilization, data storage utilization, network utilization, and so on. The application manager may receive (604) these performance indicators from the compute nodes through a network connections such as, for example, JTAG network connections.

When the performance indicators are implemented as pluggable processing component performance profile indicators, historical performance indictors, predictive performance indicators, or system administrator advice indicators, the performance indicators are often produced during previous executions of the pluggable processing components (210) and stored for later use. Accordingly, receiving (604) a plurality of performance indicators produced during execution of the pluggable processing components (210) according to the method of FIG. 6 may also be carried out by retrieving the performance indicators from a data storage repository.

When the performance indicators are implemented as environmental condition indicators, the environmental condition indicators may specify information about the environment of the compute nodes such as, for example, the ambient temperature, humidity, vibration levels, and so on. The environmental condition indicators may also specify information about the environment of the data being processed by the pluggable components (210) such as, for example, whether the data represents an image of a rainy day, a sunny day, an overcast day, and so on. When the environmental condition indicators may specify information about the environment of the compute nodes, receiving (604) a plurality of performance indicators produced during execution of the pluggable processing components (210) according to the method of FIG. 6 may also be carried out by receiving measurements from environmental sensors installed in or near the compute nodes. When the environmental condition indicators may specify information about the environment of the data being processed by the pluggable components (210), receiving (604) a plurality of performance indicators produced during execution of the pluggable processing components (210) according to the method of FIG. 6 may also be carried out by analyzing the input or output data of the pluggable processing components (210) to identify environmental condition indicators using other available compute nodes and retrieving the results.

The method of FIG. 6 includes altering (612) the current configuration (602) of the pluggable processing components (210) in dependence upon the performance indicators and one or more additional pluggable processing components (214). In many embodiments, such as the example of FIG. 6, the current configuration (602) is altered based on a particular rule set. Accordingly, altering (612) the current configuration (602) of the pluggable processing components (210) according to the method of FIG. 6 includes selecting (614) one of a plurality of rule sets (610) defining reconfiguration suggestions in dependence upon business objectives (608), the performance indicators, and one or more additional pluggable processing components (214). The business objectives (608) of FIG. 6 are data structures that represent preferences of the organization on whose behalf the application is processed by the compute nodes. For example, a business objective of an organization on whose behalf the compute nodes process the facial recognition system described above may include a preference that facial recognition accuracy is more important than the speed at which a match occurs when accuracy and speed are mutually exclusive due, for example, to limited processing resources. The reconfiguration rule sets (610) of FIG. 6 are data structures that specify criteria for altering the configuration of pluggable processing components used to carry out an application and the manner in which the configuration is altered. Each reconfiguration rule set (610) may specify a different manner of reconfiguring the configuration (602) of the pluggable processing components (210) used to carry out the application.

Selecting (614) one of a plurality of rule sets (610) defining reconfiguration suggestions according to the method of FIG. 6 may be carried out by comparing the business objective (608), the performance indicators (606), and the current configuration (602) to the criteria specified in each rule set (610) and identifying the rule set (610) that matches the business objective (608), the performance indicators (606), and the current configuration (602). For example, consider again the exemplary facial recognition system carried out by the pluggable processing components illustrated in FIG. 6 and the exemplary business objective in which recognition accuracy more important than the speed at which the facial recognition occurs. Further consider that the performance indicators specify that the image containing the face for recognition was taken on a rainy day. In such an example, the application manager may select a rule set that suggests replacing the Face Detection Component 3 and the Alignment Component 1 in the current configuration (602) with additional pluggable processing components (214) that are more accurate at detecting a face in the rain and determining the face's orientation in the rain. In the altered configuration (620) of FIG. 6, the Face Detection Component 3 is replaced with the Face Detection Component 5, and the Alignment Component 1 is replaced with the Alignment Component 2.

In the example of FIG. 6, altering (612) the current configuration (602) of the pluggable processing components (210) includes removing (616) one of the pluggable processing components (210) from the current configuration (602). Removing (616) one of the pluggable processing components (210) from the current configuration (602) according to the method of FIG. 6 may be carried out by deleting references to the particular pluggable processing component for removal in the current configuration (602) or redirecting the data flow for the application so that the pluggable processing component is no longer involved in processing any pertinent data for the application.

Altering (612) the current configuration (602) of the pluggable processing components (210) according to the method of FIG. 6 includes adding (618) one of the additional pluggable processing components (214) to the current configuration (602). Adding (618) one of the additional pluggable processing components (214) to the current configuration (602) according to the method of FIG. 6 may be carried out by adding references to the additional pluggable processing component to be added in the current configuration (602) or redirecting the data flow for the application so that the additional pluggable processing component is now involved in processing pertinent data for the application.

Rather than removing pluggable processing components and adding additional pluggable processing components to the current configuration for an application, in some embodiments the pluggable processing components may merely be reordered. For further explanation, therefore, FIG. 7 sets forth a flow chart illustrating a further exemplary method for managing the performance of an application carried out using a plurality of pluggable processing components according to embodiments of the present invention.

Figure 7:
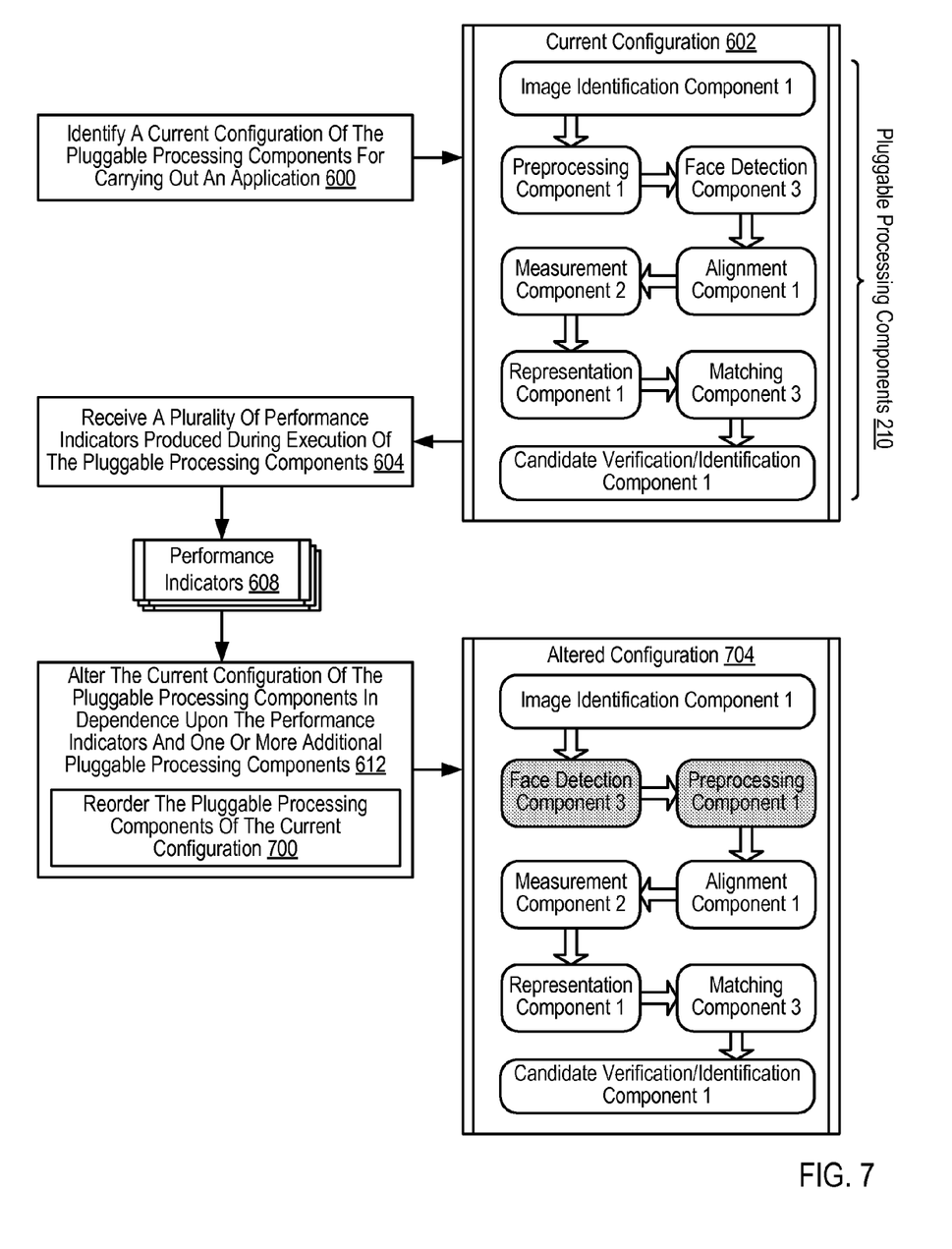
FIG. 7 sets forth a flow chart illustrating a further exemplary method for managing the performance of an application carried out using a plurality of pluggable processing components according to embodiments of the present invention.

The method of FIG. 7 is similar to the method of FIG. 6. That is, the method of FIG. 7 includes: identifying (600) a current configuration (602) of the pluggable processing components (210) for carrying out the application; receiving (604) a plurality of performance indicators (608) produced during execution of the pluggable processing components (210); and altering (612) the current configuration (602) of the pluggable processing components (210) in dependence upon the performance indicators (608) and one or more additional pluggable processing components.

In the method of FIG. 7, however, altering (612) the current configuration (602) of the pluggable processing components (210) includes reordering (700) the pluggable processing components of the current configuration. Reordering (700) the pluggable processing components of the current configuration according to the method of FIG. 7 may be carried out by modifying the data flow for the pluggable processing components (210) specified by the current configuration (602). For example, consider the facial recognition system carried out using the pluggable components illustrated in FIG. 7. Further consider that accuracy of the facial recognition for images capture on sunny days improves when preprocessing occurs before the face is detected in the image, but that when images are captured on rainy days, accuracy of the facial recognition improves when preprocessing occurs after the face is detected in the image. Further consider that the performance indicators specify that the image currently being processed in the facial recognition system was capture on a rainy day. In such an example, therefore, the altered configuration (704) specifies data flows such that data passes first through the Face Detection Component 3 and then through the Preprocessing Component 1.

Rather than replacing pluggable processing components for an application or merely reordering the pluggable processing components, in some embodiments additional pluggable processing components may be added to an application's configuration to alleviate processing bottlenecks. For further explanation, FIG. 8 sets forth a flow chart illustrating a further exemplary method for managing the performance of an application carried out using a plurality of pluggable processing components according to embodiments of the present invention.

Figure 8:
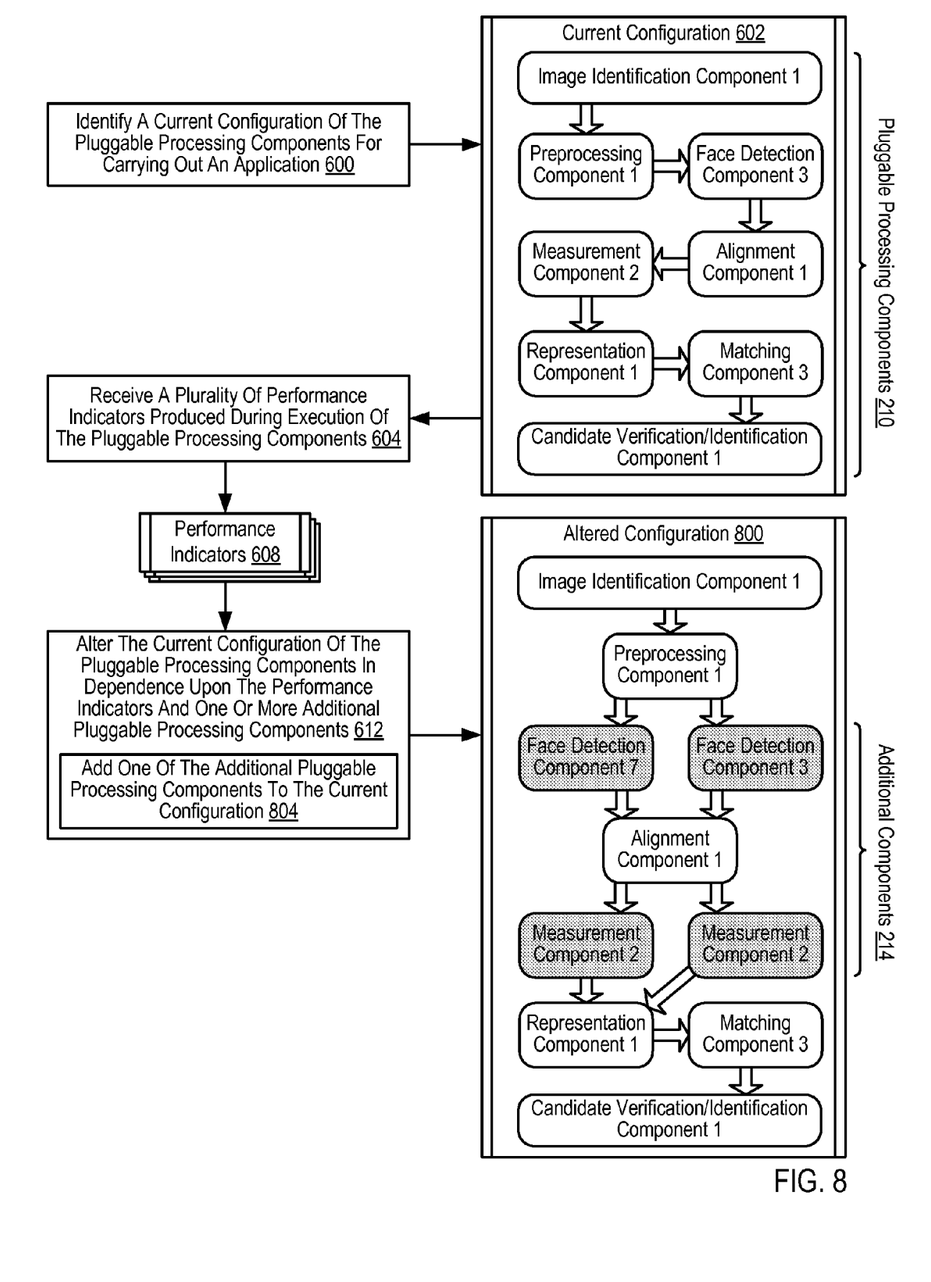
FIG. 8 sets forth a flow chart illustrating a further exemplary method for managing the performance of an application carried out using a plurality of pluggable processing components according to embodiments of the present invention.

The method of FIG. 8 is similar to the method of FIG. 6. That is, the method of FIG. 8 includes: identifying (600) a current configuration (602) of the pluggable processing components (210) for carrying out the application; receiving (604) a plurality of performance indicators (608) produced during execution of the pluggable processing components (210); and altering (612) the current configuration (602) of the pluggable processing components (210) in dependence upon the performance indicators (608) and one or more additional pluggable processing components.

In the method of FIG. 8, however, altering (612) the current configuration (602) of the pluggable processing components (210) includes adding (804) one of the additional pluggable processing components (214) to the current configuration (602). Adding (804) one of the additional pluggable processing components (214) to the current configuration (602) according to the method of FIG. 8 includes adding references to the additional pluggable processing component to be added in the current configuration (602) or redirecting the data flow for the application so that the additional pluggable processing component is now involved in processing pertinent data for the application. For example, consider the facial recognition system carried out using the pluggable components illustrated in FIG. 8 and that the performance indicators specify that a bottleneck exists with the Face Detection Component 3 and the Measurement Component 2 in the current configuration (602) for the application. Further consider that different face detection components use different algorithms to identify a face in an image and that each algorithm performs more efficiently than the others under particular circumstances. Accordingly in the example of FIG. 8, the application manager adds Face Detection Component 7 to process an image in parallel with the existing Face Detection Component 3 and alters the current configuration (602) to specify that the Alignment Component 1 utilize the data from the first face detection component to detect the face in the image. Similarly, the application manager adds a duplicate Measurement Component 2 to the altered configuration (800) and alters the configuration (800) to specify that the two measurement components measure facial features of the image in parallel to increase data processing throughput.

Exemplary embodiments of the present invention are described largely in the context of a fully functional computer system for managing the performance of an application carried out using a plurality of pluggable processing components. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing the performance of an application carried out using a plurality of pluggable processing components, the pluggable processing components executed on a plurality of compute nodes, the method comprising:
    identifying a current configuration of the pluggable processing components for carrying out the application;
    receiving a plurality of performance indicators produced during execution of the pluggable processing components; and
    altering the current configuration of the pluggable processing components in dependence upon the performance indicators and one or more additional pluggable processing components.

2. The method of claim 1 wherein altering the current configuration of the pluggable processing components in dependence upon the performance indicators and one or more additional pluggable processing components further comprising adding one of the additional pluggable processing components to the current configuration.

3. The method of claim 1 wherein altering the current configuration of the pluggable processing components in dependence upon the performance indicators and one or more additional pluggable processing components further comprising removing one of the pluggable processing components from the current configuration.

4. The method of claim 1 wherein altering the current configuration of the pluggable processing components in dependence upon the performance indicators and one or more additional pluggable processing components further comprises reordering the pluggable processing components of the current configuration.

5. The method of claim 1 wherein the performance indicators include indicators for inputs and outputs of one or more of the pluggable processing components, indicators for resource consumption, indicators for pluggable processing component performance profiles, indicators for historical performance, indicators for predictive performance, indicators for environmental conditions, or indicators for system administrator advice.

6. The method of claim 1 wherein altering the current configuration of the pluggable processing components in dependence upon the performance indicators and one or more additional pluggable processing components further comprises selecting one of a plurality of rule sets defining reconfiguration suggestions in dependence upon business objectives, the performance indicators, and one or more additional pluggable processing components.

7. A computing system capable of managing the performance of an application carried out using a plurality of pluggable processing components, the pluggable processing components executed on a plurality of compute nodes, the computing system comprising one or more computer processors and computer memory operatively coupled to the computer processors, the computer memory for the computing system having disposed within it computer program instructions capable of:
    identifying a current configuration of the pluggable processing components for carrying out the application;
    receiving a plurality of performance indicators produced during execution of the pluggable processing components; and
    altering the current configuration of the pluggable processing components in dependence upon the performance indicators and one or more additional pluggable processing components.

8. The computing system of claim 7 wherein altering the current configuration of the pluggable processing components in dependence upon the performance indicators and one or more additional pluggable processing components further comprising adding one of the additional pluggable processing components to the current configuration.

9. The computing system of claim 7 wherein altering the current configuration of the pluggable processing components in dependence upon the performance indicators and one or more additional pluggable processing components further comprising removing one of the pluggable processing components from the current configuration.

10. The computing system of claim 7 wherein altering the current configuration of the pluggable processing components in dependence upon the performance indicators and one or more additional pluggable processing components further comprises reordering the pluggable processing components of the current configuration.

11. The computing system of claim 7 wherein the performance indicators include indicators for inputs and outputs of one or more of the pluggable processing components, indicators for resource consumption, indicators for pluggable processing component performance profiles, indicators for historical performance, indicators for predictive performance, indicators for environmental conditions, or indicators for system administrator advice.

12. The computing system of claim 7 wherein altering the current configuration of the pluggable processing components in dependence upon the performance indicators and one or more additional pluggable processing components further comprises selecting one of a plurality of rule sets defining reconfiguration suggestions in dependence upon business objectives, the performance indicators, and one or more additional pluggable processing components.

13. A computer program product for managing the performance of an application carried out using a plurality of pluggable processing components, the pluggable processing components executed on a plurality of compute nodes, the computer program product disposed upon a non-signal computer readable medium, the computer program product comprising computer program instructions capable of:
    identifying a current configuration of the pluggable processing components for carrying out the application;
    receiving a plurality of performance indicators produced during execution of the pluggable processing components; and
    altering the current configuration of the pluggable processing components in dependence upon the performance indicators and one or more additional pluggable processing components.

14. The computer program product of claim 13 wherein altering the current configuration of the pluggable processing components in dependence upon the performance indicators and one or more additional pluggable processing components further comprising adding one of the additional pluggable processing components to the current configuration.

15. The computer program product of claim 13 wherein altering the current configuration of the pluggable processing components in dependence upon the performance indicators and one or more additional pluggable processing components further comprising removing one of the pluggable processing components from the current configuration.

16. The computer program product of claim 13 wherein altering the current configuration of the pluggable processing components in dependence upon the performance indicators and one or more additional pluggable processing components further comprises reordering the pluggable processing components of the current configuration.

17. The computer program product of claim 13 wherein the performance indicators include indicators for inputs and outputs of one or more of the pluggable processing components, indicators for resource consumption, indicators for pluggable processing component performance profiles, indicators for historical performance, indicators for predictive performance, indicators for environmental conditions, or indicators for system administrator advice.

18. The computer program product of claim 13 wherein altering the current configuration of the pluggable processing components in dependence upon the performance indicators and one or more additional pluggable processing components further comprises selecting one of a plurality of rule sets defining reconfiguration suggestions in dependence upon business objectives, the performance indicators, and one or more additional pluggable processing components.

* * * * *